Dec. 1, 1942.   R. E. FOGG   2,303,927
COUPLING
Filed Dec. 20, 1941
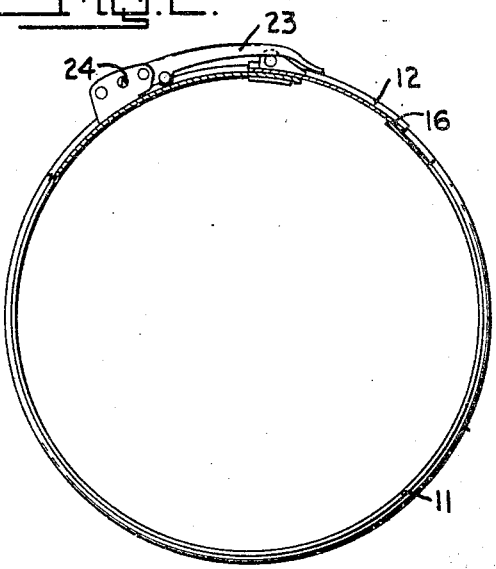
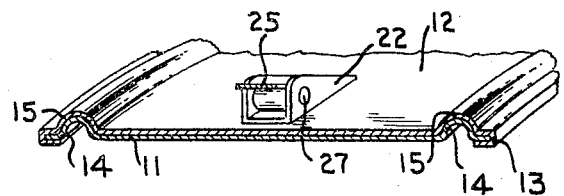
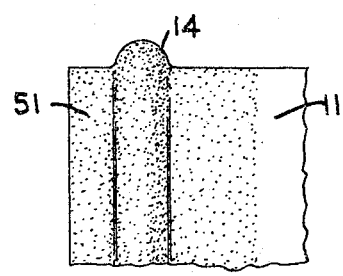
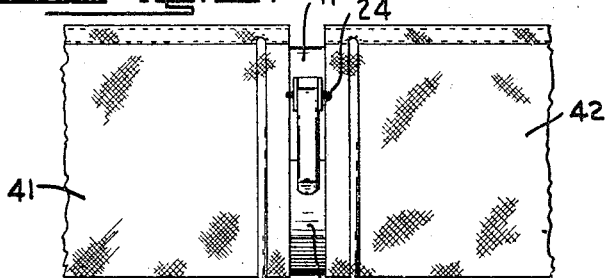
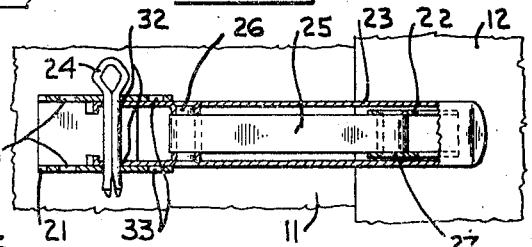
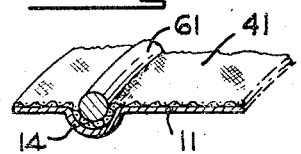
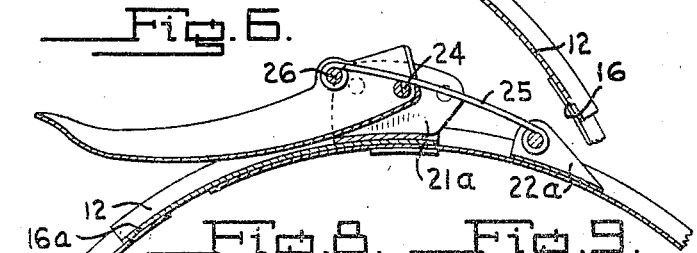
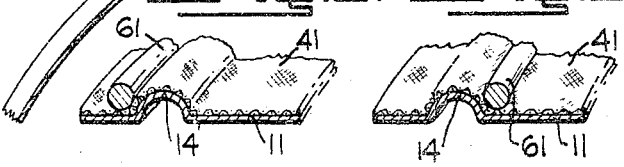
Inventor
Robert E. Fogg
By
Attorney Patented Dec. 1, 1942

2,303,927

UNITED STATES PATENT OFFICE 2,303,927

COUPLING

Robert E. Fogg, Wilmington, Del., assignor to E. I. du Pont de Nemours & Company, Wilmington, Del., a corporation of Delaware Application December 20, 1941, Serial No. 423,753

5 Claims. (Cl. 285—71)

This invention relates to the joining of sections of flexible piping, especially collapsible conduits of the type used as air ducts in mine ventilating systems. More particularly it appertains to couplings for large diameter fabric tubing.

In mining operations ventilating systems are subject to frequent changes in location and as the operations progress, certain portions of such systems may be extended and others abandoned. As a consequence, couplings and flexible sections of the tubing are continually being connected and disconnected. Falling rocks frequently destroy and/or puncture a section of ventilating tubing and if the tubing is too near the blasting face, the concussion of a blast may rip the tubing apart. There is therefore a great demand for a coupling which is simple in operation and which can be engaged and disengaged from tubing sections without special operations, such as sewing, and special fittings, such as flanges, straps, and the like.

The primary object of this invention was to provide a coupling by which the open ends of two sections of fabric tubing might be easily and positively connected and readily detached or separated and which requires no special attachments or arrangements in the ends of the tubular sections which it is to join. Other objects are to provide couplings for fabric tubing which are simple in construction, relatively inexpensive, economical in manufacture, easy to operate, durable, light in weight, which have no parts likely to cause trouble by rusting or corroding and which are especially adapted for reuse. Still a further object was to design a coupling which would expand to make a tight joint with fabric tubing overlying its ends and which would not interfere or complicate the removal of the worn or damaged sections of tubing.

It has now been found that a coupling of a type described in detail hereinafter overcomes the common objections heretofore encountered in mine ventilating systems of the aforementioned type. The present invention provides an improved expanding coupling which can be contracted to slip inside the end of a section of flexible tubing and thereafter by expanding to produce a satisfactory joint.

How the foregoing objects and related ends are accomplished will be apparent from the following exposition in which are disclosed the principle and divers embodiments of the invention, including the best modes contemplated for carrying out the same. The written description is amplified by the accompanying drawing in which:

Figure 1 is a fragmentary side elevation view showing two sections of fabric tubing joined by means of a coupling of this invention;

Figure 2 is an end elevation view partly in section of a coupling of this invention;

Figure 3 is a fragmentary perspective view partly in section along the line 3—3 of Figure 4;

Figure 4 is a fragmentary end elevation view partly in section of the clamping means and adjacent portions of the coupling;

Figure 5 is a sectional plan view taken along the line 5—5 of Figure 4;

Figure 6 is an elevation view similar to Figure 4 but showing the clamping device in open position;

Figure 7 is a fragmentary side elevation view of an especially surfaced coupling;

Figures 8 and 9 are fragmentary views similar to Figure 3 showing the coupling expanded against the fabric and outer hoops; and Figure 10 is a view similar to Figure 8 in which the coupling reinforcing bead extends inwardly.

The coupling of this invention comprises primarily a split expandable metal collar or nipple 11 made of thin steel approximately .045 inch in thickness, indicated by the numeral 11 in the drawing. Joining the sides of the split portions in overlapping relation is a correspondingly formed strip 12. The edges of the piece 12, as indicated in Figure 3, are turned over at 13 to provide a sliding fit and to prevent its disengagement from the main body of the coupling. Both the main collar portion 11 and the connecting strap 12 have rolled in beads as indicated at 14 and 15 which have the double purpose of conferring rigidity on the coupling and providing an engaging means for the fabric tubing. One end of the strip 12 is firmly secured, for example, by spot welding to the collar 11 at 16.

The contraction or expansion of the collar is brought about by means of a stretcher device (holder, clasp, latch, catch, fastening) comprising end pieces 21 and 22, secured to the collar 11 and strap 12 respectively (Figure 4), a handle 23 secured to the bracket or hinge piece 21 by means of a cotter pin 24 or equivalent means and a spring strap 25 secured at its ends by pintles 26 and 27 to the handle 23 and the U-shaped bracket 22 respectively. The brackets 21 and 22 are secured to the cooperating parts of the collar and strip by countersunk rivets, spot welding, or in some equivalent manner. The bracket 21 has a series of apertures 31, 32, and 33 which are adapted to receive the cotter pin 24. By this arrangement the location of the end of the handle 23 may be varied as desired by suitably locating the cotter pin (with the handle thereon) in the desired set of holes.

A modified arrangement is shown in Figure 6 in which the bracket 22—A is secured to the main body of the collar and the bracket 21—A is secured to the strap 12 which is secured to the main collar portion at 16—A.

If desired, the coupling may have an attachment for securing it to a suspending means, such as a cable, and this may conveniently be a hook of the type shown in U. S. A. Patent No. 2,089,940. This hook should, like the brackets 21 and 22, conform to the surface of the collar where it is attached.

In operation the coupling is contracted by opening the handle of the catch to a position shown in Figure 6 and slipped into the ends of the sections of tubing to be joined. The catch is then closed expanding the coupling 11 and bringing it into tight and securely fitted engagement with the tubing sections 41 and 21, as shown in Figure 1. The tubing of the type now commonly employed is quite strong and has sufficient elasticity to form with the coupling a satisfactory joint having all of the desirable characteristics of the joints heretofore made with complicated coupling devices and obviating the main drawbacks of the prior art arrangements.

If the joint is to be placed under exceptionally heavy lengthwise tension, it may be desirable to roughen the surface of the coupling where it underlies the fabric tubing in order to increase the resistance to slipping. In Figure 7 a portion of a coupling so roughened is shown at 51 and various means of accomplishing this end, for example, securing carborundum or sand particles to the outer collar surface by means of a lacquer or related coating or adhesive compositions, sand blasting the coupling surface, and spraying on metal in the manner described in U. S. A. Patent No. 2,020,776 (Goebel), may be resorted to.

It may sometimes be desirable to expand the coupling against a hoop in addition to the fabric tubing and such an arrangement is shown in Figures 8, 9, and 10. The hoop which is indicated as 61 overlies the fabric 41 and may be on the side of the bead 14 toward the edge of the coupling or inwardly of the bead as shown in Figure 9. If desired the bead 14 may be rolled towards the interior instead of outwardly of the coupling in which case it furnishes a very satisfactory seating arrangement for the hoop.

The hoop 61 may be of any desired cross-sectional shape. For economy manufacture, sturdiness, and capacity for withstanding rough handling, the circular cross-section is preferred.

The hoop may be made of any desired metal. Ordinarily it is constructed of the same substance used in making the coupling. Those skilled in the art will appreciate that this outer hoop is not necessary to the proper functioning of the apparatus but that it may be advantageously employed where long lengths of ducts are unsupported and reliance is placed on the coupling arrangement alone for holding the tubing sections properly joined.

From a consideration of Figures 4 and 6, it will be apparent that the pintle 26 moves in a circular path between the cotter pin 24 or equivalent as the handle 23 is brought toward the center of the coupling in the expanding operation. During the movement the pintle 26 crosses the line joining the centers of the cotter pin 24 and the pintle 27 and thereafter a locking action is produced. The use of an arching spring for the member 25 has numerous advantages including a resilient locking when the catch is closed and the application of less strain on the fabric as the lever 23 is moved to a closed position. By predetermination of the strength of the spring 25, the pressure applied to the fabric during the closing operation can be nicely regulated. Springs having a compressibility of 125–150 pounds are quite satisfactory with the conventional types of fabric tubing. In special instances higher or lower compressibilities may be used advantageously. Springs calibrated at 300 pounds have been employed successfully with tubing that has been in use for many months.

From a practical standpoint, it is desirable to correlate the strength of the spring 25 with the tearing strength of the fabric tubing. In a preferred embodiment the compressibility of the spring is such that it is adapted to bow outwardly and stop the closing movement of the lever 23 before the force exerted by the expanding coupling approaches undesirably close to that which would cause the tearing of the tubing.

In modifications where the coupling is expanded against the outer rings or hoops (Figures 7, 8, and 9), the predetermination of the spring strength is a less critical feature since the hoops prevent the application of excessive concentric straining forces on the fabric tubing.

Another advantage of the outer hoops is that they improve the anchorage of the coupling to the tubing section. This is a very important factor in certain types of installation, for example, those in which long lengths of the tubing are suspended more or less vertically and dependence is placed on the coupling for maintaining the units in the system properly connected.

For convenience the ventilating of mines and the like has been used as the basis of the description of the invention. Those skilled in the art will of course realize that ventilating systems of this character are widely used in other fields, for example, in the construction of ships and buildings, etc., where the air must be changed. The air ducts may be of the suction or pressure type as will be clear from the art, particularly that cited in the earlier part of this specification. The metal used in forming the coupling is as indicated above, preferably 0.045 inch thick for tubing of 12 and 30 inches in diameter but other thicknesses, for example, 0.035 to 0.062, have been found quite satisfactory for the same size tubing. The strength required in the coupling will of course be the regulating factor and this varies with the variations in the demands placed upon the coupling. In general, sheet material less than 0.025 inch thick would not be used because of lack of strength and stiffness. Material greater than 0.075 inch thick gives couplings so hard to operate that only very special circumstances would require its use. In lighter stocks, more than the illustrated number of beads may be used to increase the rigidity of the coupling. These supplementary beads may extend outwardly or inwardly as desired.

The shape of the bead is not critical so long as it does not present a surface or edge which might cut the fabric tubing.

The location of the circumferential beads in the coupling may be on the edge or closer to the center than shown in the drawing.

The principle involved in the present coupling is that of radial expansion and many other arrangements may be utilized for securing this action, for example, a rod extending interiorly of the coupling as a chord adapted to spread the portions of the coupling which it connects, toggle linkage inside the coupling and the like.

An expanding device located inside the coupling may cause turbulence in the air flowing therethrough and will therefore be open to one of the objections encountered in heretofore known couplings. Experience has shown that any obstruction to the air-flow is detrimental not only because it cuts down the effective cross-sectional area of the duct but also because of the bearing or chattering which may be produced in the tubing if the obstruction is of a character which is susceptible to fluttering.

Any woven felted or otherwise suitable fabric, for example, canvas, drill, brattice cloth, etc., and composite sheet materials comprising more than one layer or ply, such as the product resulting from uniting a layer of metal foil to duck and the rubberized textiles obtained by spreading a layer of rubber on the surface of a fabric, may be used in forming the tubing provided it has the strength and elasticity necessary to enable it to withstand the stressing action of the coupling and to hold firmly thereon. The invention is not limited to flexible tubing formed in any particular manner but for completeness it may be pointed out that one very satisfactory method of forming tubing of this character is to align the side edges of a long section of fabric, fold the aligned portions together into a hem or seam and sew it, usually with two rows of stitches.

The tubing usually used in ventilating mines, tunnels, underground drifts, etc. is about 12 inches in diameter but the coupling of this invention may obviously be proportioned to join tubing of greater or lesser circumferences.

Although the coupling illustrated is annular, it will be obvious that cylindrical sections of other configurations may be employed. The coupling is preferably made of stainless steel sheet rolled into the desired arcuate form. Corrosion resistant metals and alloys are preferred because of the conditions commonly encountered in underground workings but if this is not controlling, any sheet metal, having comparable physical characteristics, may be used satisfactorily. Ordinarily iron, aluminum, copper, nickel and their alloys are employed.

Many of the advantages of the present invention will be obvious from the foregoing description. It may be pointed out in addition that the principal advantage is that the coupling is in one piece. Prior art couplings are made up of separate coacting parts and were generally lacking in utility if one of these parts was not available when the coupling was assembled. The advantages of the present coupling, so far as the tubing is concerned, is quite outstanding. A concentric stretch is applied to the tubing in one place (or around its circumference where it overlies the coupling) and compensating shrinkage is allowed to take place in adjacent portions. The location of the bead on the collar and its connecting strap has a bearing on this feature and it is preferred that the bead be far enough from the center of the coupling to permit the expansion stress and strain to be distributed over several stitches in the tubing hem on each side of the bead.

With the present coupling the time required to assemble the ventilating tubing is only one-tenth of that found necessary with previous devices.

As many apparent widely different embodiments of this invention may be made without departing from the spirit and scope thereof, it is to be understood that the invention is not limited to the specific embodiments thereof except as defined in the appended claims.

I claim:

1. A coupling for flexible tubing, said coupling comprising a split steel band 0.035 to 0.062 inch thick and a strap overlapping the free ends, a circumferential bead near each edge, the said strap being conjoined fixedly to one end of the said band, brackets on the said strap and the opposite end of said band, a clasp pivoted in each bracket and comprising a spring strip and a handle adapted to cover the same, the said spring strip and handle being pivotally connected between the said bracket connections, the said strap overlying the edges of the band to keep the ends aligned during opening and closing of the clasp, and said spring strip adapted to yield to allow the said coupling to adjust itself to the diameter of the said flexible tubing.

2. A coupling for flexible tubing and the like, comprising a split collar, a strap extension secured to one end of the collar and overlying the collar ends, and means secured to the strap and to the free end of the collar for expanding said collar against the inner walls of fabric or like tubing being coupled, and circumferential beads on said collar and strap adapted to engage the ends of fabric or like tubing joined by the coupling and to anchor said tubing ends thereto.

3. A coupling for flexible tubing and the like, comprising a split collar, a strap extension conforming to and secured to one end of the collar and overlying the collar ends, and a linkage secured to the strap and to the free end of the collar, said linkage comprising a pivoted lever and spring and being arranged to pull said strap and said other end of the collar toward each other as it opens and to force them apart as it closes, and circumferential beads on said collar and strap adapted to engage the ends of fabric or like tubing joined by the coupling and to anchor said tubing ends thereto.

4. A coupling for flexible tubing and the like, comprising a split collar, a strap extension secured to one end of the collar and overlying the other end, and a catch secured to the strap and to the free end of the collar, said catch comprising a pivoted lever handle and strip spring link fitting inside said handle and said catch being arranged to pull said strap and said other end of the collar toward each other as it opens and to force them apart as it closes, said spring compensating for variations in the circumference of the tubing joined by the coupling, and circumferential beads on said collar and strap adapted to engage the ends of fabric or like tubing joined by the coupling and to anchor said tubing ends thereto.

5. A coupling for flexible tubing and the like, comprising a split collar, a strap extension secured to one end of the collar and overlying the other end, and a catch secured to the strap and to the said other end of the collar, said catch being arranged to pull said strap and said other end of the collar toward each other as it opens and to force them apart as it closes and comprising a flat spring and handle linkage, said handle adapted to close over said spring, said spring having a compressibility in the range 125 to 150 pounds, and circumferential beads on said collar and strap adapted to engage the ends of fabric or like tubing joined by the coupling and to anchor said tubing ends thereto.

ROBERT E. FOGG.